Aug. 11, 1959 S. W. ALDERFER 2,898,634
METHOD FOR PRODUCING FOAMED PLASTIC MATERIAL
Filed Jan. 29, 1957
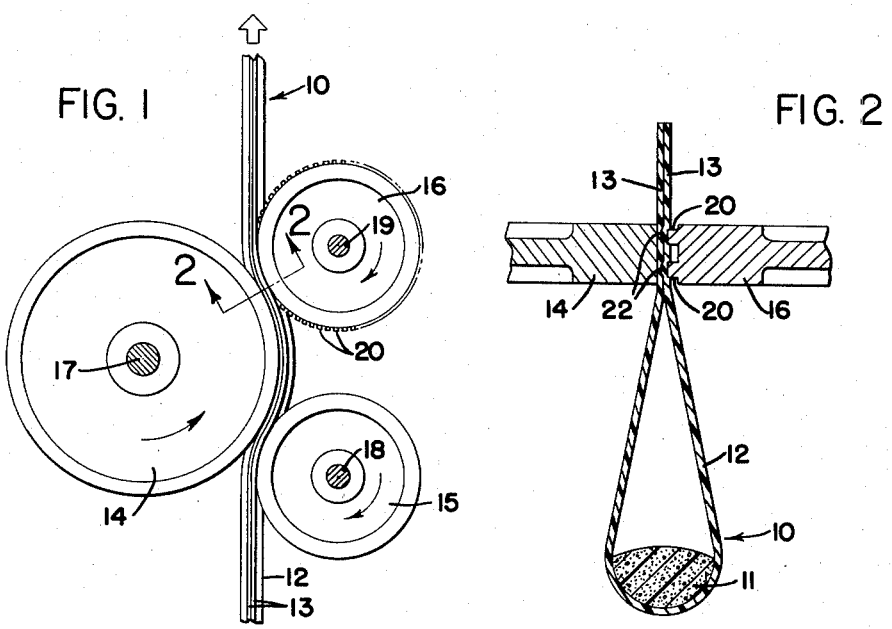
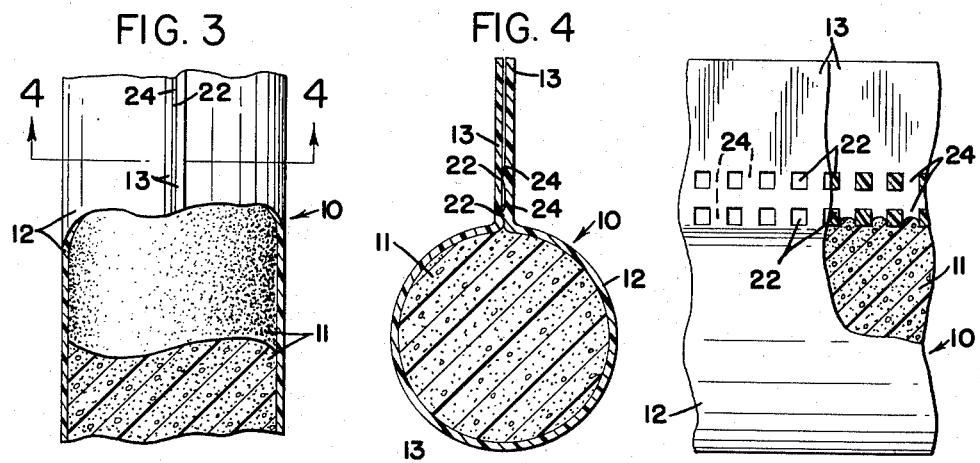
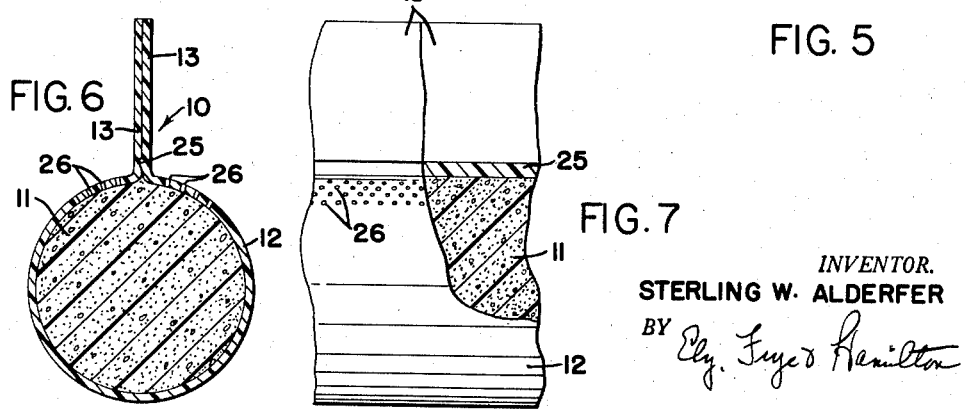
INVENTOR.
STERLING W. ALDERFER
BY
ATTORNEYS United States Patent Office 2,898,634
Patented Aug. 11, 1959

2,898,634
METHOD FOR PRODUCING FOAMED PLASTIC MATERIAL

Sterling W. Alderfer, Akron, Ohio, assignor to Sterling Alderfer Company, Akron, Ohio, a corporation of Ohio Application January 29, 1957, Serial No. 636,993

3 Claims. (Cl. 18—59)

The present invention relates to an improved method for the production of foamed plastic materials. More particularly, the invention relates to improvements in the production of foamed-in-place isocyanate resins.

Isocyanate resins, also known as "polyurethane" or simply "urethane" resins, are a comparatively recent entry in the field of plastics in this country. The isocyanates of greatest commercial importance are the diisocyanates; of these, tolylene diisocyanate is most widely used. A variety of compounds containing two or more "active hydrogen" groups, e.g., hydroxyl, amino, and carboxyl, may be used to react with the diisocyanates to produce polymers. The most widely investigated compounds for reaction with diisocyanates, and the principal ones used on a commercial scale at this time, are the polyesters. These polyesters (or alkyd resins) are generally liquids of moderate molecular weight, e.g. 1000 to 2500, and terminate principally in hydroxyl groups. The polyesters vary greatly in their degree of branching, the desired final polymer properties determining the degree of branching used. Linear polyesters usually lead to elastic polyurethanes, whereas highly branched polyesters give rigid polyurethanes.

Polyurethane foams are cellular materials prepared primarily by the reaction of polyisocyanates, polyesters and water, in the absence of air. The significant feature of this system is the reaction of the polyisocyanate and water to liberate carbon dioxide while simultaneously the polymerization and cross-linking reactions between the polyisocyanate and polyester entrap the liberated carbon dioxide. The density of the foam is therefore controlled by the amount of water and excess polyisocyanate used in the formulation. Since these materials normally react slowly, tertiary amines are used as catalysts and accelerate the foaming and curing reactions.

The relative merits of urethane foams are numerous in that they can be foamed in place and are self-curing, due to the exothermic heat of reaction generated in the foaming reaction. They can be formulated to have a wide range of physical properties and densities ranging from 1.5 to 40 lb./cu. ft. and can be made flame resistant enough so that they will not sustain combustion. The three general foam classifications are flexible, semi-rigid, and rigid, each of which is produced by the reaction of a specific polyester or mixture of resins with the polyisocyanate.

A polyurethane foam material may be produced by depositing a reactant mixture of polyisocyanates, polyesters and water on a web of flexible material which is impervious to air and not deleteriously affected by either the foam or reactants, joining the edges of the web in a tight seal to form an outer casing or jacket, and allowing the foam forming reaction to run substantially to completion.

It is also necessary that the air entrapped within the jacket at the time of sealing be excluded as soon as possible because of its deleterious effect on the foam forming reaction. Various means have been employed for squeezing, pressing or otherwise attempting to apply mechanical pressure sufficient to exclude air from within the reaction jacket. Such attempts have met with limited success.

Accordingly, it is an object of the invention to provide an improved method for the production of foamed plastic materials. It is a further object to provide an improved method for the manufacture of polyurethane foam material within a jacket of a flexible material which is sealed in such a manner as to provide for the controlled exclusion of air from within the jacket, while the foam forming reaction is taking place, and yet retain the foam within the jacket.

These objects, and the advantages of the invention will be apparent in view of the following detailed description and the attached drawings.

In the drawings:

Fig. 1 is a schematic view of apparatus suitable for sealing a folded web of jacket material in the manner of the invention;

Fig. 2 is an enlarged section through the sealing device taken substantially on line 2—2 of Fig. 1;

Fig. 3 is a top view, broken away to show several portions of a sealed jacket after the foam forming reaction has run to completion;

Fig. 4 is a section taken on line 4—4 of Fig. 3;

Fig. 5 is an elevation, partly broken away, of the sealed jacket of Fig. 4;

Fig. 6 is a view, similar to Fig. 4, of a modified form of the reaction jacket; and Fig. 7 is a view, similar to Fig. 5, of the modified form.

An article of polyurethane foam according to the invention is indicated generally by the numeral 10. The reactant material 11 is confined within the jacket, casing or integument material 12. The material 12 is selected from those materials which in sheet or web form are flexible, or slightly distensible, capable of being joined as by sealing or stitching, impermeable to the reactant mixture and the gas evolved therefrom, and not deleteriously affected by either the reactants per se or by the heat resulting from the exothermic nature of the foaming reaction. In a preferred form of the invention, the material 12 is a vinyl film and the joining is accomplished by heat sealing. The material 12 could also be a fabric material which has been sized or treated so as to possess the aforementioned properties and which could be joined by stitching or sewing. Other suitable materials possessing the aforesaid properties will occur to those skilled in the art.

The reactant mixture is deposited on a web of jacket material 12 from a suitable device which mixes the polyisocyanates, polyesters and water in appropriate amounts. Such a device has not been illustrated since it is well known to those skilled in the art. The edge portions 13 of the material 12 are then brought together by hand or suitable mechanical means and passed through the set of rolls indicated at 14, 15 and 16 in Fig. 1.

Roll 14 rotates on a shaft 17 and is provided with heating means, preferably electrical resistance elements, which will raise the temperature of the roll 14 to a degree above the softening point but below the melting point of the material 12. Roll 15 is mounted on a shaft 18 and is positioned so as to guide the folded web of material 12 into contact with the periphery of the heated roll 14. While in contact with the heated roll, the material 12 is softened so that the edge portions 13 will adhere to each other when mechanical pressure is applied.

As best shown in Fig. 2, mechanical pressure may be applied to the heat softened edge portion 13 by the roll 16, mounted on a shaft 19, which has a regularly spaced series of tooth-like peripheral projections 20. The projections 20 are preferably in a double row and force the heat softened edges together. Referring also to Figs. 4 and 5, the pressure of the projections 20 is backed up by the roll 14 and the edge portions of the material 12 are joined as indicated at 22. Between the heat and pressure formed joints 22 are passageways 24 which provide communication between the interior of the jacket and the atmosphere.

As shown in Fig. 2, the edge portions 13 are joined before the reactant material 11 has significantly reacted to form a foam having a cellular structure. As the foam forming reaction runs to completion, air trapped within the jacket will be excluded through the passages 24 as the reactant material increases in volume. Referring to Figs. 4 and 5, the reactant material continues to expand until the interior volume of the jacket is filled with foam. However, the surface tension of the reactant material is such that the foam will not expand to any significant degree through the passage 24, even though the size of the passages is adequate to permit exclusion of all air from within the jacket.

Referring to Figs. 6 and 7, in an alternative form of the invention the edge portions 13 of the material 12 are joined together in a continuous seal as indicated at 25 with a series of small regularly spaced openings 26 being formed through the wall of the jacket material. The openings 26 are sufficiently large to permit air entrapped within the sealed jacket to escape and yet sufficiently small so that the surface tension of the reactant mixture will prevent any appreciable escape of foam. The openings 26 are preferably formed in the material 12 by available mechanical means after the edge portions have been sealed.

What is claimed is:

1. A process for producing a foam within a flexible casing, comprising the steps of, depositing a charge of reactants capable of forming said foam on a web of casing, folding said web with said reactants therein before there has been any significant foam forming reaction, joining the web edges immediately after folding to provide a jacket in the form of an elongated free hanging loop, providing a series of passages in said jacket of a size sufficient to afford communication between the interior of the jacket and the atmosphere while retaining the foam within the jacket, suspending said web by its joined edges, and continuing to suspend said web from said edges while the foam forming reactions runs substantially to completion.

2. A process for producing a foam within a flexible casing, comprising the steps of, depositing a charge of reactants capable of forming said foam on a web of casing, folding said web with said reactants therein before there has been any significant foam forming reaction, joining the web edges immediately after folding to provide a foam tight jacket in the form of an elongated free hanging loop, providing a series of passageways transversely of and between said joined edges of a size sufficient to afford communication between the interior of the jacket and the atmosphere while retaining the foam within the jacket, suspending said web by its joined edges, and continuing to suspend said web from said edges while the foam forming reactions runs substantially to completion.

3. A process for producing a foam within a flexible casing, comprising the steps of, depositing a charge of reactants capable of forming said foam on a web of casing, folding said web with said reactants therein before there has been any significant foam forming reaction, joining the web edges immediately after folding to provide a foam tight jacket in the form of an elongated free hanging loop, providing a series of openings in said jacket adjacent said joined edges of a size sufficient to afford communication between the interior of the jacket and the atmosphere while retaining the foam within the jacket, suspending said web by its joined edges, and continuing to suspend said web from said edges while the foam forming reactions runs substantially to completion.

References Cited in the file of this patent

UNITED STATES PATENTS

| | | |
|---|---|---|
| 2,141,405 | Randall | Dec. 27, 1938 |
| 2,340,260 | Clunan | Jan. 25, 1944 |
| 2,385,229 | Patterson | Sept. 18, 1945 |
| 2,690,987 | Jefferies et al. | Oct. 5, 1954 |
| 2,718,105 | Ferguson et al. | Sept. 20, 1955 |
| 2,767,461 | Lebold et al. | Oct. 23, 1956 |

FOREIGN PATENTS

| | | |
|---|---|---|
| 1,010,631 | France | Mar. 26, 1952 |